No. 887,168. PATENTED MAY 12, 1908.
L. WILL.
KITCHEN CABINET.
APPLICATION FILED APR. 12, 1907.
2 SHEETS—SHEET 1.
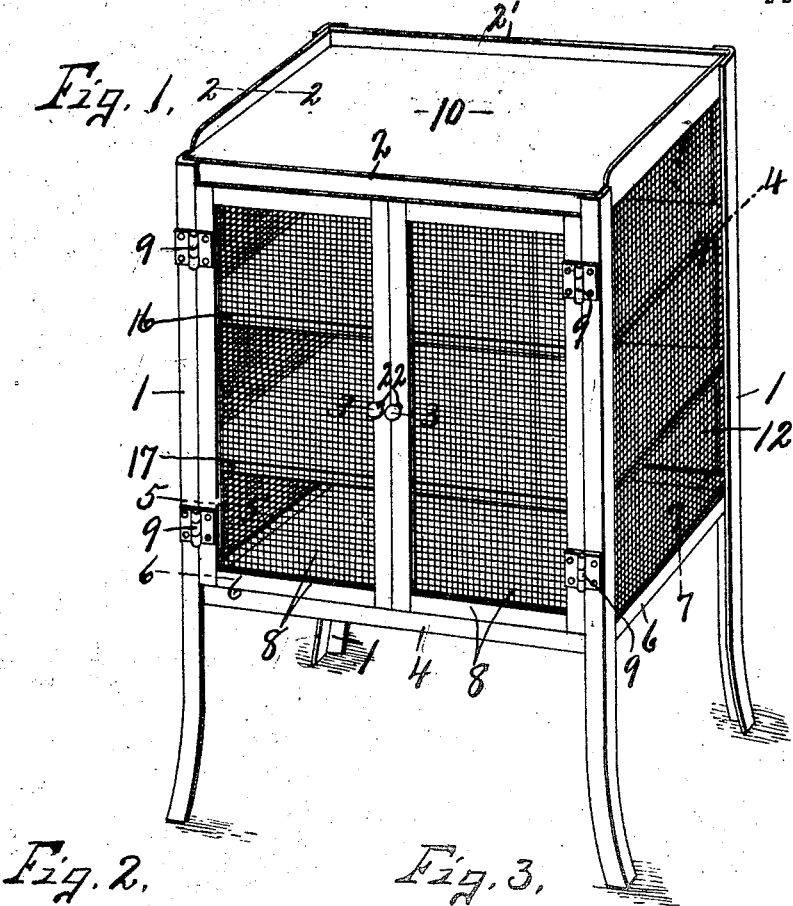
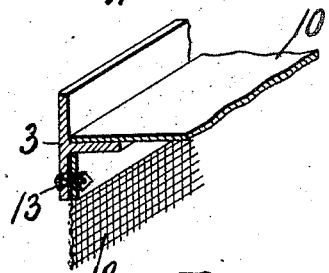
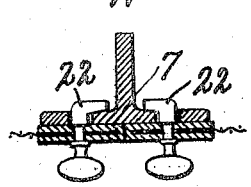
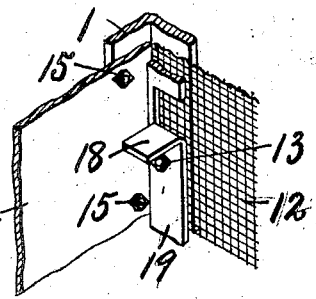
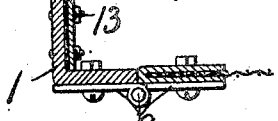
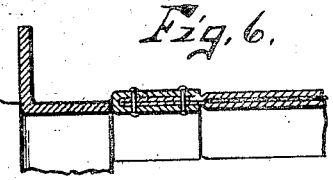
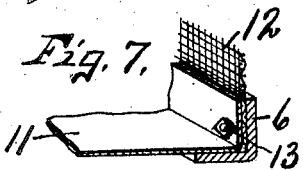
Witnesses
Sidney H. Abbott
H. E. Chase
Inventor
Louis Will
By
Howard P. Denison
Attorney No. 887,168.
PATENTED MAY 12, 1908.
L. WILL.
KITCHEN CABINET.
APPLICATION FILED APR. 12, 1907.
2 SHEETS—SHEET 2.
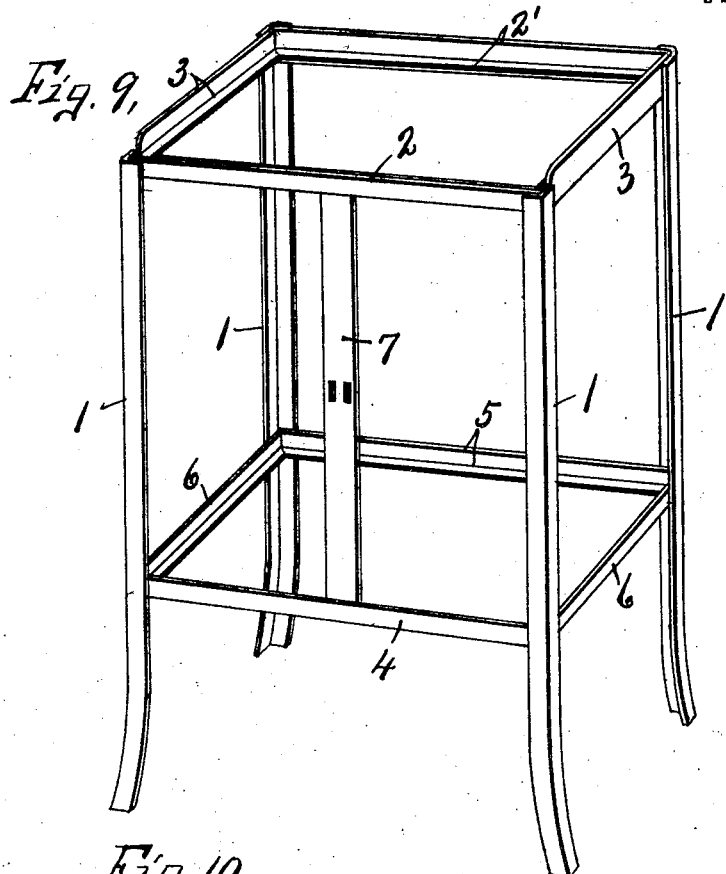
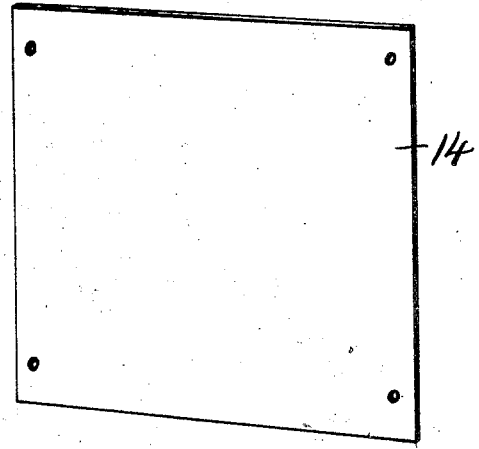
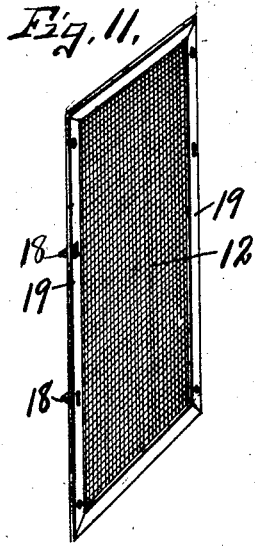
Witnesses
Sidney H. Abbott
H. E. Chase
Inventor
Louis Will
By Howard P. Denison
Attorney

UNITED STATES PATENT OFFICE.

LOUIS WILL, OF SYRACUSE, NEW YORK.

KITCHEN-CABINET.

No. 887,168.

Specification of Letters Patent.

Patented May 12, 1908.

Application filed April 12, 1907. Serial No. 367,743.

*To all whom it may concern:*

Be it known that I, LOUIS WILL, of Syracuse, in the county of Onondaga, in the State of New York, have invented new and useful Improvements in Kitchen-Cabinets, of which the following, taken in connection with the accompanying drawings, is a full, clear, and exact description.

This invention relates to certain improvements in kitchen cabinets for the reception of meats, vegetables and other edibles which it may be desired to protect from flies and other insects, and still be exposed to the circulation of air, whereby such eatables may be kept reasonably cool for short periods of time.

My main object is to produce a thoroughly sanitary kitchen cabinet from sheet metal and wire-screen material capable of being readily cleansed and sterilized at intervals, when necessary, and to obviate the liability of saturation by odious gases and vapors escaping from the vegetables or meats which may be confined therein.

A further object is to construct a skeleton frame of sheet metal and to provide it with removable shelves or partitions which may be taken out for cleansing, or separate sterilization, or cleansing of all parts of the shelves and skeleton frame.

Other objects and uses relating to the specific parts and structures of the cabinet will be brought out in the following description.

In the drawings—Figure 1 is a perspective view of my improved kitchen cabinet. Figs. 2, 3, 4, 5, 6, and 7, are enlarged detail sectional views taken on lines, 2—2, 3—3, 4—4, 5—5, 6—6, and 7—7, Fig. 1. Fig. 8 is a perspective view of a fragmentary portion of one corner of one of the shelves. Fig. 9 is a perspective view of the detached frame of the cabinet. Figs. 10 and 11 are similar views of the back and one of the detached screen sides adapted to be removably inserted in the frame.

The main supporting frame comprises essentially a series of in this instance, four upright corner standards or legs —1— of angle iron which are rigidly united at the top to a horizontal rectangular frame composed of front and rear bars —2— and —2'— and side bars —3—, the front bar being usually made of angle iron, while the side and rear bars are preferably formed of T-iron, and the lower intermediate portions of the standards are similarly united to a bottom rectangular frame composed of front, rear and side bars —4—, —5— and —6—, the latter being preferably made of angle iron.

The bars constituting these top and bottom frames are preferably riveted at the corners to the upright standards or legs —1—, as best seen in Fig. 10, so as to form a rigid skeleton frame of rectangular form, although I do not limit myself to any particular form of frame, nor to the particular form of iron or metal of which the frame is made so long as the upright standards or legs are rigidly united to suitable top and bottom frames of metal spaced some distance apart to determine the interior capacity of the cabinet.

The central portions of the upper and lower bars —2— and —4— are united by a vertical partition bar —7— parallel with and substantially midway between the front upright standards —1—, said partition bar preferably consisting of a T-iron, and is for the purpose of forming a stop for the oppositely swinging front doors —8— which are hinged by suitable hinges —9— to the front corner posts 1.

Each of the bars constituting the upper and lower horizontal frames is provided with an inwardly projecting horizontal flange, the horizontal flanges of the upper frame supporting the top plate or shelf —10— while the horizontal flanges of the bottom frame support a similar shelf —11—, both of said shelves being removable to permit the thorough cleansing or sterilizing of the same and the supports upon which they rest.

Each side of the cabinet is provided with a screen panel —12— consisting of a wire screen mounted in a suitable frame which is fitted in between the adjacent legs or corner standards —1— and also between the adjacent bars —3— and —6— of the upper and lower horizontal frames, said screen and its supporting frame being removable, but is adapted to be held in operative position by any suitable fastening means, as screws —13—.

The back —14— of the cabinet, which preferably consists of a single piece of sheet metal, is also detachably secured between and to the back legs —1— and rear bars of the upper and lower frames by suitable fastening means, as screws —15—.

The interior of the cabinet is divided into compartments by a series of, in this instance, two additional shelves or partitions —16— and 17—, the corners of which loosely rest upon shoulders —18— formed by cutting and pressing inwardly portions of the supporting frame-bars, as —19—, of the side screens —12—, said shelves 16 and 17 having their longitudinal edges bent downwardly forming lengthwise reinforcing flanges —20— which, however, are cut away at the corners, as best seen in Fig. 8 so as to rest flatwise upon the supports —18—. It is now apparent that the screen sides —12—, as well as the back, and also the top, bottom and intermediate shelves, are readily removable leaving all of the parts of the skeleton frame exposed so that they may be thoroughly cleansed or sterilized, the doors —8— being adapted to be thrown open during the cleansing operation, and when they are closed their meeting ends abut against the central jamb bar —7— to which they are locked by suitable catches or locking devices —22—.

In assembling the parts of my invention the frame-bars consisting of the legs —1—, upper frame-bars —2—, 2'— and —3—, and lower frame-bars —4—, —5— and —6— are rigidly secured together, and the doors —8— being open, the back piece may be inserted through the opening in the back by tilting it until wholly within the frame, whereupon it may be righted and forced back against the flanges of the legs —1— and rear bars of the upper and lower horizontal frames. In like manner, the screen sides and their supporting frames may be inserted through the side openings in the main frame and then drawn or forced against the flanges of the legs and upper and lower frame bars to which they are adapted to be secured.

When the back and sides are in place the bottom and intermediate shelves are inserted through the front opening in the frame by properly tilting them, the bottom shelf loosely resting upon the horizontal flanges of the lower horizontal frame composed of the bars —4—, 5— and —6—, while the intermediate shelves are successively placed in position from the bottom up with their corners resting upon the ledges or shoulders —18—. Either before or after the bottom and intermediate shelves are placed in position the top shelf 10— is similarly supported upon the horizontal flanges of the upper frame.

What I claim is:

A kitchen cabinet comprising a rigid metal skeleton frame having upright corner legs of angle-iron, an upper frame member and a lower frame member fitted between the legs and detachably-secured thereto, the upper frame member having front and rear bars of angle-iron and having side bars of T-iron, all of the bars of the lower frame being formed of angle-iron, a front partition bar of T-iron arranged between the upper and lower frame members substantially mid-way between the front corner legs, a top carried by the upper frame member, a back fitted between the upper and lower frame members and secured to the rear corner legs, a bottom supported by the lower frame member, supporting frame bars secured to said corner legs and having struck-out portions forming supporting lugs, screen sides carried by said supporting frame bars, shelves supported on said supporting lugs, and a screened front hinged to the front corner legs and having means for connecting the same with said front partition bar, substantially as described.

In witness whereof I have hereunto set my hand this 10 day of April 1907.

LOUIS WILL.

Witnesses:
M. M. NOTT,
HOWARD P. DENISON.